United States Patent

Beer et al.

[11] Patent Number: 5,109,974
[45] Date of Patent: May 5, 1992

[54] ASSEMBLY LINE SYSTEM

[75] Inventors: Christian Beer, Boniswil; Christoph Wassmer; Alois Wyss, both of Brugg, all of Switzerland

[73] Assignee: Menziken Automation Mat AG, Menziken, Switzerland

[21] Appl. No.: 675,642

[22] Filed: Mar. 27, 1991

[30] Foreign Application Priority Data

May 11, 1990 [CH] Switzerland .................. 01609/90

[51] Int. Cl.$^5$ .................................... B65G 37/00
[52] U.S. Cl. .................... 198/346.1; 198/345.3; 29/33 P
[58] Field of Search .......... 198/345.1, 345.3, 346.1; 29/33 P, 563

[56] References Cited

U.S. PATENT DOCUMENTS 4,736,830  4/1988  Hofmann .
4,850,470  7/1989  Ferkany .................. 198/345.3

FOREIGN PATENT DOCUMENTS 0203625  12/1986  European Pat. Off. ......... 198/345.3
62-255316  11/1987  Japan ............................. 198/345.3

Primary Examiner—Joseph E. Valenza
Assistant Examiner—Tuan N. Nguyen
Attorney, Agent, or Firm—Frishauf, Holtz, Goodman & Woodward

[57] ABSTRACT

To increase the overall operating speed of a production, assembly or manufacturing line system, a rapid transport system (6–17) is located beneath normally slow-moving transport belts (3), coupled to a vertical raising system (8, 9), engageable beneath a transport plate between individual belts of the transport system, and rapidly moving a transport plate (2) into and off selected work stations, faster than the movement of the belts. Preferably, the raising system is coupled to a carriage (6) which, in turn, is moved rapidly along the transport path (A, B) by a piston-cylinder unit (16, 17), a motor with a gear belt, or any other similar linear motion transmission.

18 Claims, 1 Drawing Sheet

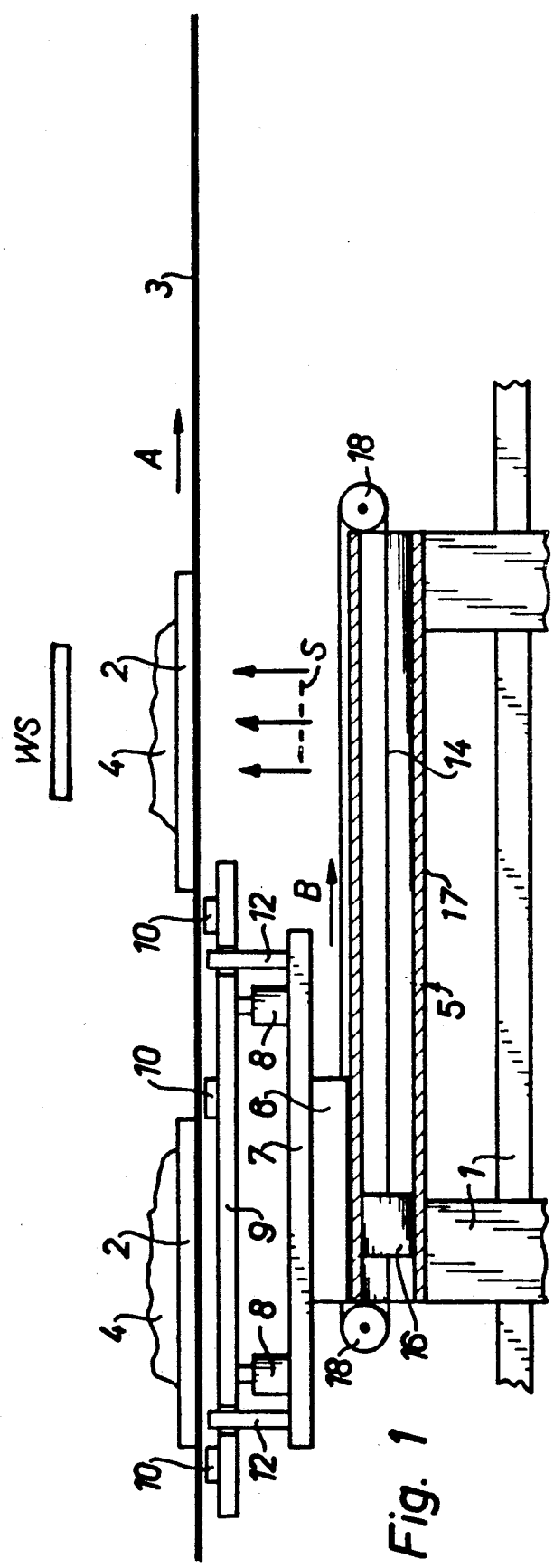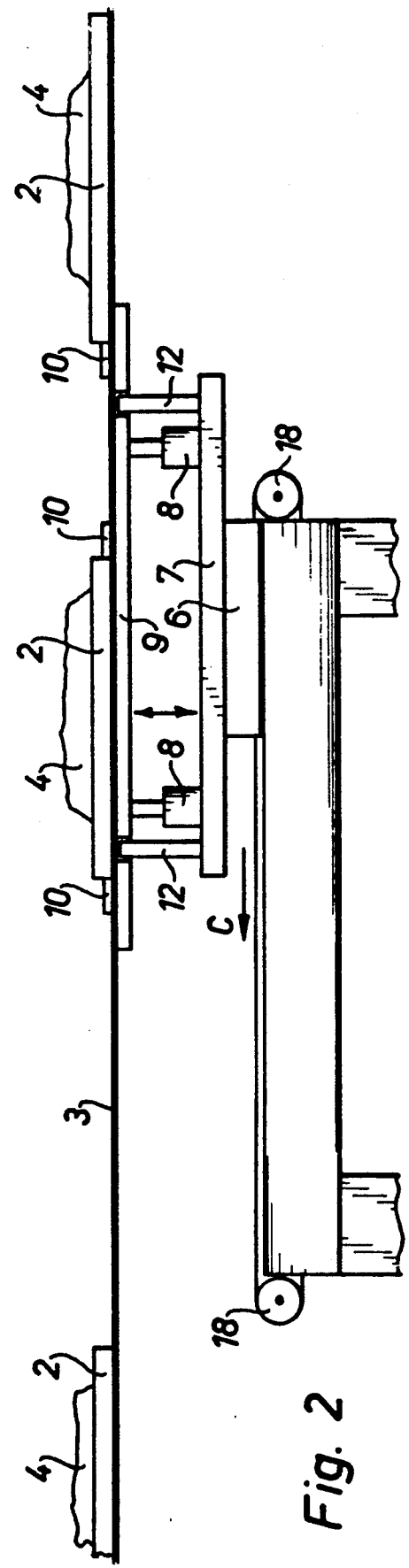

ASSEMBLY LINE SYSTEM

Reference to related patent, the disclosure of which is hereby incorporated by reference, assigned to the assignee of the present application: U.S. Pat. No. 4,736,830, Hofmann.

FIELD OF THE INVENTION

The present invention relates to an assembly line or production line system in which a plurality of transport plates, on which workpieces can be secured, are moved by a transport belt system past work stations, and more particularly to permit rapid movement of the transport plates to and from the work stations.

BACKGROUND

The referenced U.S. Pat. No. 4,736,830, Hofmann, the disclosure of which is hereby incorporated by reference, describes a linear production line system in which transport plates are moved by transport belts between work stations, for example from work station to work station along a predetermined path, defined by the path of the transport system. The transport plates retain workpieces thereon, for working on the workpieces at the work stations, for example manually, by machine tools, or the like. The transport plates, upon reaching a work station, are lifted off the transport belts. They are stopped, to permit assembly work, or working on the workpieces, and then, after the required operations are finished, are again released for further transport by the transport belts. In such a system, the clock time or cadence is determined by that one of the work stations which requires the longest operating time on the workpieces. The transport belts are driven continuously with a constant speed, which can be comparatively low.

THE INVENTION

It is an object to increase the transport speed of transport plates to selected work stations and away from these stations to improve the overall time factor of the entire production line or assembly line system.

Briefly, a rapid transport carriage, coupled to a high-speed drive system, is engageable with the transport plates to rapidly shift the transport plates on or off the slow moving transport belts and move them at a higher rate to, or away from selected work stations, where they can then, again, be placed on the normal transport belts for movement directly under the next work station, and arrested thereat, if desired.

Increasing the speed of movement of the transport plates into and away from selected work stations permits longer arresting time, handling and working time at selected work stations, without requiring change of the overall speed of movement of the transport belt system, or to increase the spacing between sequential transport plates on the transport belts.

DRAWINGS:

FIG. 1 is a schematic side view of the system with the accelerated transport arrangement in an initial position, before accelerating two transport plates; and FIG. 2 is a fragmentary view of the system of FIG. 1, showing the transport plate at an end position of the accelerated movement thereof.

DETAILED DESCRIPTION.

A frame 1, for example secured to the floor of a production line plant, secures all structures necessary for holding and operating the transport system. Transport plates 2 are moved along a predetermined path, shown by the arrow A, by frictionally engaging the upper run of transport belts 3. The transport belts 3 move with constant speed in the direction of the arrow A, along the frame 1, and past working stations WS (FIG. 2), at which operations on workpieces 4 on the transport plates can be carried out. For a detailed description, reference is made to the U.S. Pat. No. 4,736,830, Hofmann. The transport plates 2 can, selectively, be stopped at the respective work stations WS by a stop mechanism S, shown only schematically in FIG. 2, and raising the transport plates 2 off the belts, and engaging them against suitable counter elements, as explained in the referenced U.S. Pat. No. 4,736,830. The transport plates 2, preferably, are of generally square or rectangular form, are made of steel, and carry suitable holding elements or structures to retain the workpieces 4 thereon.

The speed of the transport belts 3, and hence the transport speed of the transport plates 2, is comparatively low and, generally, is determined by the time required for working on, or assembling of components at respective work stations. Selected work stations, however, may have a working or assembly time requirement which should not depend on the relatively slow transport speed of the belt system 3. Thus, selected work stations may require more time than that of others.

In accordance with a feature of the invention, an auxiliary rapid transport arrangement is provided for the transport plates, for shifting plates into and off selected work stations. This system is shown in detail in FIGS. 1 and 2.

In ordinary operation, the transport plates 2 are loosely positioned on the belts 3 which operate, for example, in the direction of the arrow A, in a continuously moving manner. Usually, the belt system includes at least two, and possibly more parallel spaced belts on which the plates are secured, suitably supported, for example, by support rollers.

In accordance with a feature of the invention, a linear rapid drive system is located beneath the belt systems 3, secured to the frame 1, and providing a transport speed which is higher than that of the moving speed of the belts 3, and may be quite high with respect thereto. Preferably, this drive system includes a piston-cylinder unit 5, which can preferably be pneumatically operated; alternatively, any other linear motion transmission element may be used, for example an electric servo motor providing linear drive, for example by a toothed gear engaging a rack, an elongated gear belt, or the like. The drive system 5 extends parallel to the transport path shown schematically by arrow A through which the transport plates 2 move. The stroke or operating length of the linear drive system depends on the size of the work station and the plates. Desirably, it is longer than one plate 2, preferably, for example, about twice the length of a transport plate 2 measured in the direction of the arrow A. The piston-cylinder unit 5, preferably, is so constructed (see FIG. 2) that a slider or carriage 6, suitably slidably supported, for example on an elongated cylinder unit 17, has its piston 16 coupled to a flexible steel tape or ribbon 14, guided about deflection or return rollers 18. The slider or carriage 6 can slide, for example, directly on the elongated cylinder 17, within which the piston 16 operates. End seals, caps, and supply or drain of pressure fluid to the cylinder have been omitted from the drawing, since all of these can be in accordance with well known constructions. The piston 16 can be operated by compressed air. The steel tape 14, to move the carriage 6, will move in the direction of the arrow B; to return the carriage, the fluid to the piston 16-cylinder 17 is reversed, and the carriage will move in the direction of the arrow C (FIG. 2).

As an alternative to using an elongated piston-cylinder system, a servo motor can be secured to the frame 1 and, in conventional manner, coupled to a gear belt which, for example, is elongated, and is, in turn, connected to the slider or carriage 6 to move the carriage, respectively, in the direction of the arrow B or C.

The slider or carriage 6 is securely coupled to a plate 7 on which two or more spaced pneumatically or electrically controlled lifting elements 8 are located. The lifting elements 8 work in conjunction with a raising plate 9, whose vertical movement is guided by vertical guide posts 12. The raising plate 9 has extending projections 10 which are located between or at the outside of the transport belt 3 to engage the transport plates 2 as seen in FIG. 1, the right projection 10, with respect to the transport direction B, is in advance of the plate 2 to be transported, to remove a previously worked-on plate 2.

OPERATION

It is desired to rapidly move a transport plate 2 from a waiting position or a transport belt—at the left in FIG. 1—to a work station WS. The work station WS is subsequent—with respect to the direction of movement shown by the arrow A of the transport belts 3. The rapid transport system is activated. First, the lifting elements 8 raise plate 9 and the projections 10 engage a transport plate 2. Preferably, the carriage 6, together with plate 7, lifting elements 8, raising plate 9 and projections 10, and the transport plate 2 thereon, are moved at a speed which is higher than that of the transport belt system 3 in the direction of the arrow B to the work station, shown schematically at WS, FIG. 2. At that station, the transport plate 2 is centered and locked in predetermined position and retained thereat, as disclosed, for example, in U.S. Pat. No. 4,736,830, and therefore only shown schematically by the stop arrows S in FIG. 2. The requisite assembly or work operations can then be carried out on the workpiece 4 at the work station WS.

The lifting elements 8 are then dropped, so that the locating projections 10 and plate 9 will lose contact with the transport plate 2, and the transport plate 2 will again be in gravitational frictional engagement with the transport belts 3, unless still or later raised by the stop arrangement S. The carriage 6, together with the elements thereon, is returned, for example by a rapid return movement in the direction of the arrow C into the position shown in FIG. 1.

The piston-cylinder arrangement 16, 17, or any other equivalent linear motion arrangement, can be suitably controlled by manual or automatic control systems; if automatically, for example in dependence on sensors, such as position sensors, light gates or the like, or in dependence on dwell time of the plates 2 at specific work stations.

Preferably, the projections 10 extend in advance of and behind the transport plates 2, so that they are lifted and guide the plates longitudinally in the path of movement, see arrows A and B.

The basic function of the subject matter to which the present invention relates is not moving a plate 2 with a workpiece 4 thereon from a work station to another, but rather to move a plate from a rest or waiting position rapidly into a selected work station WS, and then, if desired, from the respective work station rapidly back on the transport belt. Thus, at the respective work station, a rapid transport plate change can be effected. The waiting position of the plate is best seen in FIG. 1 at the left, in which the plate is then to be moved, rapidly, beneath the work station WS.

The movable elements, in accordance with the present invention, that is, parts 7-12, move between an arresting device and the carrying profile of a transport belt. Thus, the arrangement can easily be integrated into the basic system shown and described in the referenced Hofman U.S. Pat. No. 4,736,830.

The rightmost projection 10, as best seen in FIG. 2, is used to remove the previously worked-on plate with the previously worked-on workpiece 4 thereon from the work station so that the subsequently supplied plate, at a high rate of speed, will not collide with the previously worked-on plate 2.

Various changes and modifications may be made within the scope of the inventive concept.

We claim:
1. Assembly system having
a plurality of transport plates (2) for transporting workpieces (4) thereon;
a continuously moving transport belt arrangement (3) positioned below the transport plates and having a belt run in engagement with the transport plates for transporting said transport plates along a predetermined transport path (A) at a predetermined transport speed and spaced from each other;
work stations (WS) located along said path for permitting operation of said workpieces thereat,
and comprising, in accordance with the invention,
a rapid transport carriage (6) located below the transport plates (2);
means (14, 18) for guiding said carriage (6) in a path (B) parallel to said transport path (A);
linear motion drive means (14, 16, 17) coupled to said rapid transport carriage (6) for moving said carriage in a rapid transport direction (B) at a speed which is higher than the transport speed of the transport belt arrangement (3);
lifting means (8, 9) projecting from the rapid transport carriage (6) towards said transport plates and selectively projectionable or retractable to engagement with, or release from, a selected transport plate (2), positioned above said carriage, for rapid shifting of the selected transport plate along said predetermined transport path (A), including at least one positioning projection (10) which, with respect to said rapid transport direction (B), is located in advance of the engaged transport plate (2) to push away a transport plate which was previously located at said work station (WS).
2. The system of claim 1, further including stop means (S) at the work stations (WS) for arresting the transport plates at the work stations.
3. The system of claim 1, wherein said drive means (14, 16, 17) has an operating length which is dimen- sioned to be longer than, and up to about twice the length of one of the transport plates (2).

4. The system of claim 1, wherein said drive means comprises a fluid-operated piston-cylinder (16, 17) system.

5. The system of claim 4, wherein said fluid-operated piston-cylinder system comprises a compressed air system.

6. The system of claim 1, wherein said lifting means comprises at least parallel, vertically operating lifting elements (8).

7. The system of claim 6, wherein said lifting elements comprise pneumatic short-stroke piston-cylinder combinations.

8. The system of claim 1, wherein said drive means (14, 16, 17) has an operating length which is dimensioned to extend as long as about twice the length of one of the transport plates (2).

9. The system (16, 17) of claim 4, wherein the stroke length of said piston-cylinder system is about twice the length of one of said transport plates.

10. The system of claim 4, wherein the stroke length of said piston-cylinder system (16, 17) is dimensioned to be longer than, and up to about twice the length of one of the transport plates.

11. Assembly system having
a plurality of transport plates (2) for transporting workpieces (4) thereon;
a continuously moving transport belt arrangement (3) positioned below the transport plates and having a belt run in engagement with the transport plates for transporting said transport plates along a predetermined transport path (A) at a predetermined transport speed;
work stations (WS) located along said path for permitting operation of said workpieces thereat, stop means (S) at the work stations (WS) for arresting the transport plates at the work stations,
and comprising, in accordance with the invention,
a rapid transport carriage (6) located below the transport plates (2) with a fluid-operated piston-cylinder system (16, 17)
means (14, 18) for guiding said carriage (6) in a path (B) parallel to said transport path (A);
drive means (14, 16, 17) coupled to said rapid transport carriage (6) for moving said carriage at a speed which is higher than the transport speed of the transport belt arrangement (3); and
lifting means (8, 9) projecting from the rapid transport carriage (6) towards said transport plates and selectively projectionable or retractable to engagement with, or release from, a selected transport plate (2), positioned above said carriage, for rapid shifting of the selected transport plate along said predetermined transport path (A) said lifting means (8, 9) comprising an engagement element (9) engageable from below against the selected transport plate; and said lifting elements comprise pneumatic short-stroke piston-cylinder combinations locating and positioning projections (10) formed on said engagement element (9) for positioning a selected, engaged transport plate and ensuring movement of said transport plate upon rapid transport of the engagement element (9) coupled to said rapid transport carriage (6), including at least one positioning projection (10) which, with respect to said rapid transport direction (B), is located in advance of the engaged transport plate (2) to push away a transport plate which was previously located at said work station (WS).

12. The system of claim 11, wherein said drive means (14, 16, 17) comprises a linear motion transmission means.

13. The system of claim 11, wherein the fluid operating said fluid-operated piston-cylinder system comprises a compressed air system.

14. The system of claim 11, wherein said short stroke piston-cylinder combinations comprise at least essentially parallel, vertically operating lifting cylinder-piston units.

15. The system of claim 11, wherein the stroke length of said piston-cylinder system (16, 17) is about twice the length of one of said transport plates.

16. The system of claim 11, wherein the stroke length of said piston-cylinder system (16, 17) is dimensioned to be longer than, and up to about twice the length of one of the transport plates.

17. The system of claim 11, including at least one positioning projection (10) which, with respect to said rapid transport direction (B), is located in advance of the engaged transport plate (2) to push away a transport plate which was previously located at said work station (WS).

18. The system of claim 16, including at least one positioning projection (10) which, with respect to said rapid transport direction (B), is located in advance of the engaged transport plate (2) to push away a transport plate which was previously located at said work station (WS).

* * * * *